United States Patent [19]

Kucher

[11] Patent Number: 6,147,342
[45] Date of Patent: Nov. 14, 2000

[54] ENCODING SYSTEM FOR DETERMINING THE POSITION OF A CYLINDER ROD ALONG A PATH OF MOVEMENT

[75] Inventor: Trent S. Kucher, Peoria, Ill.

[73] Assignee: Caterpillar Inc., Peoria, Ill.

[21] Appl. No.: 09/088,998

[22] Filed: Jun. 2, 1998

[51] Int. Cl.[7] .................................................. G01D 5/34
[52] U.S. Cl. ...................... 250/231.13; 356/375; 341/9
[58] Field of Search ........................ 250/231.13, 231.14, 250/231.18; 356/373, 375; 341/9, 11, 13, 15

[56] References Cited

U.S. PATENT DOCUMENTS

| | | | |
|---|---|---|---|
| 4,633,224 | 12/1986 | Gipp et al. | 340/347 |
| 4,701,615 | 10/1987 | Schmitt | 250/237 |
| 4,879,555 | 11/1989 | Ichikawa et al. | 250/231.13 |
| 4,901,073 | 2/1990 | Kibrick | 341/13 |
| 5,539,993 | 7/1996 | Kilpinen et al. | 33/706 |
| 5,632,916 | 5/1997 | Lappalainen et al. | 219/212.85 |

FOREIGN PATENT DOCUMENTS

95/01510  1/1995  WIPO ............................ F15B 15/28

*Primary Examiner*—Que T. Le
*Assistant Examiner*—Kevin Pyo
*Attorney, Agent, or Firm*—Haverstock, Garrett and Roberts

[57] ABSTRACT

An encoding system for determining the position of a cylinder rod along a path of movement, the encoding system including a sequence of code segments located on the rod along the path of movement, each of the code segments including a distinct pattern of marks extending from a starting position in a direction transverse to the path of movement and identifying the position of the code segment on the rod, the encoding system further including at least one mark on the rod extending substantially continuously along the path of movement in predetermined relation to the starting positions of the patterns of marks for indicating the locations thereof.

20 Claims, 1 Drawing Sheet

U.S. Patent
Nov. 14, 2000
6,147,342
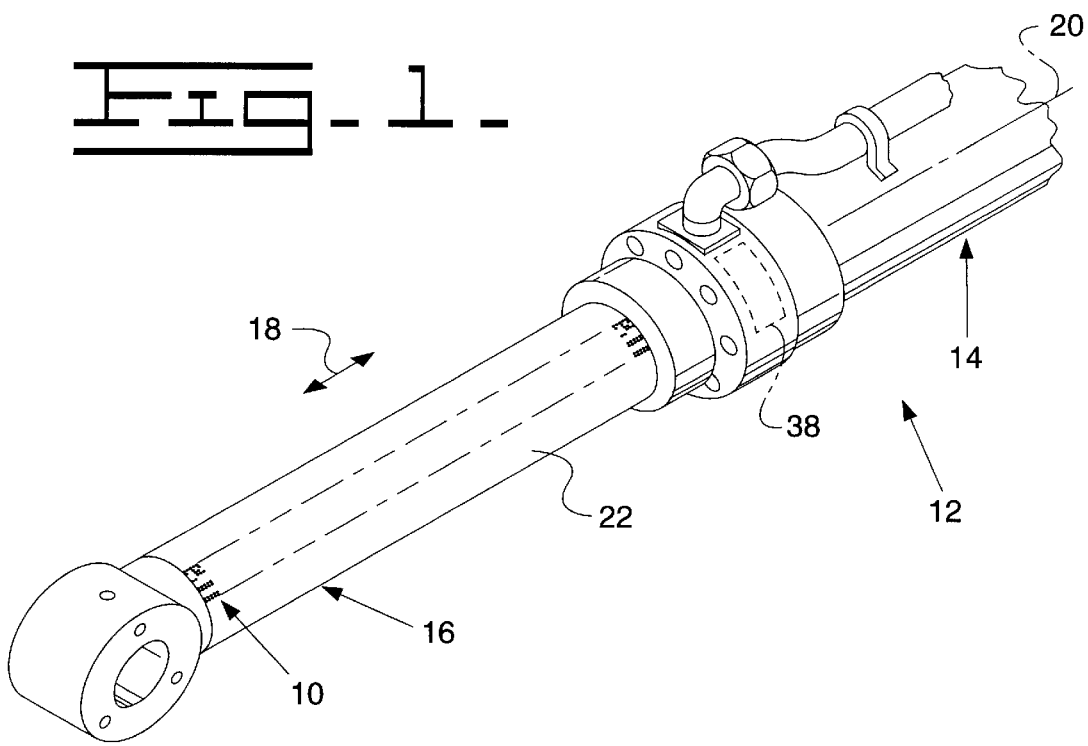
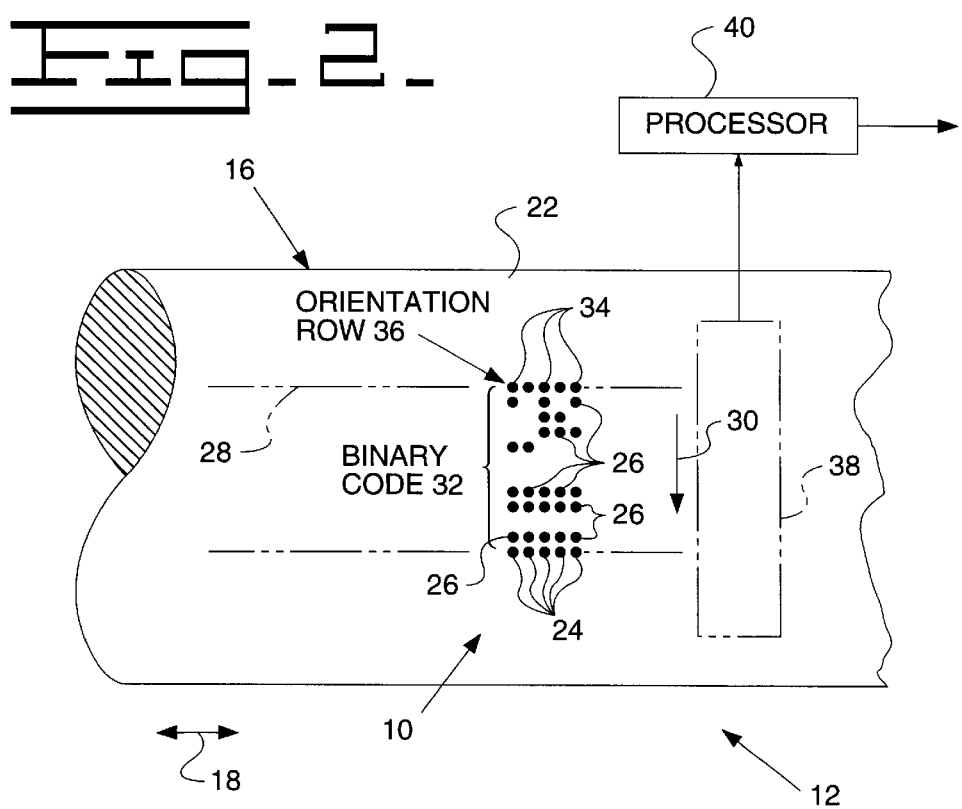

ENCODING SYSTEM FOR DETERMINING THE POSITION OF A CYLINDER ROD ALONG A PATH OF MOVEMENT

TECHNICAL FIELD

This invention relates generally to an encoding system to enable determining the position of a cylinder rod along a path of movement, and more particularly, to an encoding system that requires only a single sequence of code segments for precisely determining the position of the cylinder rod along a path of movement of the rod and/or another member such as an associated cylinder body, regardless of whether the rod and/or other member is stationary or moving at the time of the determination, and regardless of the direction of movement along the path.

BACKGROUND ART

Hydraulic, pneumatic and other actuated cylinders generally including a piston and attached cylinder rod arranged to move axially in a cylinder housing or body, are increasingly used in applications where it is desired or required to know the incremental and/or absolute position of the cylinder rod or another member such as a related cylinder body along a path of movement of one and/or the other, "absolute" referring to positional information without reference to a base, home, or starting position. The path of movement can represent, for instance, movement of the cylinder rod relative to the cylinder body or other member; movement of the cylinder body or other member relative to the cylinder rod; or any combination of relative movement between the cylinder rod, cylinder body and/or other member.

Various known linear sensors and resolvers are used for making cylinder rod and like positional determinations. However, such known linear sensors and resolvers have been found to suffer from operational inaccuracies owing to severe environmental conditions, such as temperature and humidity. Also, physical damage to such sensors under rugged work conditions can shorten their expected life, particularly, when used in the heavy equipment industry.

Various encoding systems are also known, using both incremental codes and absolute codes, for determining the position of a wide variety of elements along a path of movement, including cylinder rods. Reference for instance, Lappalainen et al. U.S. Pat. No. 5,632,916 issued May 27, 1997 to Partek Cargotec Oy; Kilpinen et al. U.S. Pat. No. 5,539,993 issued Jul. 30, 1996 to the same assignee; Schmitt U.S. Pat. No. 4,701,615 issued Oct. 20, 1987 to Johannes Heidenbain GmbH; Kibrick U.S. Pat. No. 4,901,073 issued Feb. 13, 1990 to Regent of the University of California; Gipp et al. U.S. Pat. No. 4,633,224 issued Dec. 30, 1986 to Caterpillar Inc.; and Salmi et al. International Patent Publication WO95/01510.

Problems found with various of such above referenced encoding systems include a need for an incremental scale for determining absolute position and, in some instances, the need for both an incremental scale and an absolute scale, directional limitations, lack of precision, and the need for actual movement to make the positional determinations.

Accordingly, the present invention is directed to overcoming one or more of the problems as set forth above.

DISCLOSURE OF THE INVENTION

In one embodiment of the present invention an encoding system for determining the incremental and/or absolute position of a cylinder rod along a path of movement is disclosed, the encoding system including a sequence of code segments located on the rod along the path of movement, each of the code segments including a distinct pattern of marks extending from a starting position in a direction transverse to the path of movement and identifying the position of the code segment on the rod, the encoding system further including at least one mark on the rod extending substantially continuously along the path of movement in predetermined relation to the starting positions of the patterns of marks for indicating the locations thereof.

BRIEF DESCRIPTION OF DRAWINGS

FIG. 1 is a fragmentary perspective view of a cylinder including an encoding system according to the present invention; and FIG. 2 is a fragmentary side view of the cylinder rod of the cylinder of FIG. 1 showing an exemplary portion of the encoding system including a sequence of code segments located on the surface of the rod, a sensor array for detecting the presence or absence of marks comprising the code segments, and a processor for reading the code segments.

BEST MODE FOR CARRYING OUT THE INVENTION

Referring to the drawings, in FIG. 1 an encoding system 10 according to the present invention for determining the position of a cylinder rod along a path of movement is shown on a cylinder 12. Cylinder 12 is typical of a wide variety of hydraulic, pneumatic and similarly actuated cylinders, and includes a cylinder body 14 and a cylinder rod 16. Cylinder 12 is conventionally operable to extend cylinder rod 16 from, and retract cylinder rod 16 into, cylinder body 14 along a path of movement, as represented by arrow 18, extending axially with respect to a longitudinal axis 20 of cylinder 12.

Here, it should be recognized and understood that although cylinder rod 16 is extendable and retractable relative to cylinder body 14, in actual operation cylinder body 14 or cylinder rod 16 may be held stationary, or both may be movable, such that the path of movement identified by the arrow 18 can represent actual movement of cylinder rod 16 relative to cylinder body 14, movement of cylinder body 14 relative to cylinder rod 16, or a combination of movement by both cylinder rod 16 and cylinder body 14. Additionally, it should be understood that in operation cylinder rod 16 and cylinder body 14 can be expected to rotate at least somewhat relative to one another about longitudinal axis 20. During operation of cylinder 12, it is desired to be able to determine the position of cylinder rod 16 along the path of movement represented by arrow 18, whether it is cylinder rod 16, cylinder body 14, or both cylinder rod 16 and cylinder body 14 that is moving, and under conditions wherein cylinder rod 16 and cylinder body 14 are rotated somewhat one to the other.

Referring also to FIG. 2, encoding system 10 includes a sequence of code segments 24 on an outer circumferential surface 22 of cylinder rod 16, the sequence of code segments extending a desired distance along surface 22 in the direction of the path of movement represented by arrow 18. Each code segment 24 includes a pattern of marks 26 beginning at a common starting position, represented by the line 28, and extending in a direction, represented by the arrow 30, transverse to the path of movement represented by the arrow 18. Each pattern of marks 26 forms a 10 bit binary code 32 wherein the presence, or the absence, of a mark 26 denotes either a respective binary character 1 or 0, the binary code 32 for each code segment 24 being unique and identifying the location of that code segment on cylinder rod 16. Adjacent code segments 24 are preferably located in closely spaced or substantially abutting relation as best shown in FIG. 2, such that the positional locations of the code segments and thus the position of cylinder rod 16 along the path of movement can be determined to relatively high precision.

Here it should also be recognized and understood that although each code segment 24 herein disclosed includes a ten bit binary code 32, alternatively, other binary codes, such as a gray code, or other codes, having a wide variety of numbers of bits and/or characters including more or less bits and/or characters than code 32 shown, could be utilized with equal utility, and therefore, the present invention is not intended to be limited to a ten bit binary code. It should also be recognized and understood that it is contemplated that the transverse direction of the code segments relative to the path of movement can include any of a wide variety of directions oriented angularly with respect to the path of movement, including the substantially perpendicular transverse direction represented by arrow 30 in FIG. 2, as well as directions oriented at lesser acute angles with respect to the path of movement as long as the desired degree of positional precision can be achieved. Still further, here, marks 26 are depicted as generally round dots formed on outer circumferential surface 22 of cylinder rod 16. It is contemplated that marks 26 can be formed on surface 22 of rod 16 in any convenient conventional manner, including but not limited to, by forming the marks on the cylinder rod chemically; by diffusing a material into the surface of the cylinder rod; by etching the marks on the cylinder rod using a laser or other device; or by imparting detectable capacitance characteristics to the marks or the rod using any suitable device. It is also contemplated that the marks can have a wide variety of shapes, including rectangular shapes, ovoid shapes, and the like, and can be of any desired size that provides acceptable detectability characteristics under the contemplated operating conditions. Here, it should be noted when the size of the marks is selected the size of the individual marks 26 may have an impact on the degree of positional precision attainable, the larger the marks 26, possibly the lesser the positional precision attainable, and the smaller the size of the marks, the greater precision attainable.

As mentioned above, during operation, cylinder rod 16 and/or cylinder body 14 may rotate relative to one another about longitudinal axis 20. To facilitate accurate detection of marks 26 and reading of binary codes 32 under these conditions, a plurality of orientation marks 34 located in predetermined relation to the respective code segments 24 are provided on surface 22. Here, orientation marks 34 are located directly adjacent to and in predetermined relation to starting positions 28 of the code segments forming an orientation row 36 of marks 34 that extends substantially continuously along the path of movement represented by arrow 18. In this way, a device for detecting code segments 24 located along the path of movement and having a sensory extent greater in the transverse direction than the code segments 24 can be used to identify the location of the substantially continuous orientation row 36 and thus the starting positions 28 of the code segments 24 for determining the position of cylinder rod 16, including the incremental and/or absolute position thereof, along the path of movement.

The presence, or absence, of marks 26 and orientation marks 34 can be detected or sensed for reading the binary codes 32 using a suitable detector, sensor or reader, such as, but not limited to, an optical detector; or a device capable of detecting electrical, magnetic, or capacitance characteristics resulting from the presence, or absence, of the marks.

Here, encoding system 10 includes a sensor array 38 located in cylinder body 14 alongside the path of movement in position for detecting the presence of marks 26 and 34. Sensor array 38 is conventionally constructed and operable to detect marks 26 and 34 when located in predetermined relation thereto whether cylinder rod 16 and cylinder body 14 are both stationary, or moving in either direction one relative to the other. Further, sensor array 38 has a sensory extent, that is, the capability to sense the marks, which is greater in the transverse direction than the combined transverse extent of code segments 24 and orientation marks 34 so as to be operable to detect both when cylinder rod 16 and cylinder body 14 are rotated somewhat with respect to one another about longitudinal axis 20. When the marks are detected, sensor array 38 generates and communicates signals representative of the marks to a connected device such as the processor 40 shown for reading binary codes 32 in a suitable conventional manner for determining the absolute and/or increment position of cylinder rod 16 relative to sensor array 38. To determine absolute position, only one code segment 24 needs to be read, and to determine incremental position, only a reading at a starting position and a reading at an ending position of movement is required.

Industrial Applicability

The present encoding system has utility for use with a wide variety of cylinders including, but not limited to, fluid actuated cylinders such as hydraulic fluid actuated cylinders and gaseous fluid actuated cylinders, which cylinders are typically used for a wide variety of applications such as in machines for performing work such as lifting or moving blades, scrapers, buckets and other implements on tractors, earth moving equipment, mining equipment, construction equipment and the like. The path of movement can be a path of relative displacement or movement between the cylinder rod and a cylinder operable in association therewith or another member or location, which relative displacement or movement can represent, for instance, movement of the cylinder rod relative to the cylinder or other member or location; movement of the cylinder or other member or location relative to the cylinder rod; or any combination of relative movement between the above members and/or location.

Other aspects, objects and advantages of the present invention can be obtained from a study of the drawings, the disclosure and the appended claims.

What is claimed is:

1. An encoding system for determining the position of a cylinder rod along a path of movement, comprising:

a sequence of code segments located on the rod along the path of movement, each of the code segments comprising a distinct pattern of marks extending from a starting position in a direction transverse to the path of movement and identifying the position of the code segment on the rod, and at least one orientation mark on the rod extending substantially continuously along the path of movement in predetermined relation to the starting positions of the patterns of marks for indicating the locations of the starting positions of the code segments.

2. The encoding system, as set forth in claim 1, wherein each of the patterns of marks comprises a binary code.

3. The encoding system, as set forth in claim 2, wherein the binary code comprises at least five bits.

4. The encoding system, as set forth in claim 3, wherein the binary code comprises about ten bits.

5. The encoding system, as set forth in claim 1, wherein the marks are formed on the cylinder rod chemically.

6. The encoding system, as set forth in claim 1, wherein the marks are formed on the cylinder rod by diffusing a material into the surface of the cylinder rod.

7. The encoding system, as set forth in claim 1, wherein the marks are etched on the cylinder rod.

8. The encoding system, as set forth in claim 1, wherein the marks have detectable capacitance characteristics.

9. The encoding system, as set forth in claim 1, wherein the direction transverse to the path of movement is substantially perpendicular to the path of movement.

10. The encoding system, as set forth in claim 1, wherein the direction transverse to the path of movement is a direction oriented at an acute angle to the path of movement.

11. The encoding system, as set forth in claim 1, wherein at least the marks comprising the code segments are dots.

12. The encoding system, as set forth in claim 1, wherein the sequence of the code segments comprises adjacent code segments located in substantially abutting or closely spaced relation.

13. The encoding system, as set forth in claim 1, wherein the path of movement is defined by relative movement between the cylinder rod and a cylinder body.

14. The encoding system, as set forth in claim 1, wherein the at least one orientation mark comprises a plurality of orientation marks extending in single file order along the path of movement.

15. The encoding system, as set forth in claim 1, wherein the at least one orientation mark comprises an elongate mark.

16. The encoding system, as set forth in claim 1, comprising a device for detecting the presence or absence of the marks.

17. The encoding system, as set forth in claim 16, wherein the device for detecting the presence or absence of the marks has a sensory extent greater in the direction transverse to the path of movement than the extent of the pattern of the marks.

18. A cylinder rod comprising:
- an outer circumferential surface and a longitudinal axis;
- an axially extending sequence of code segments located on the outer circumferential surface, each of the code segments comprising a distinct pattern of marks extending from a starting position in a direction transverse to the longitudinal axis and identifying the position of the code segment on the outer circumferential surface; and
- at least one orientation mark on the outer circumferential surface in predetermined relation to the starting position of the patterns of marks for indicating the locations of the starting positions of the code segments.

19. The cylinder rod, as set forth in claim 18, wherein each of the patterns of marks comprises a binary code.

20. The cylinder rod, as set forth in claim 19, wherein the binary code comprises at least five bits.

* * * * *